C. J. HOWARD.
SPEED CHANGING MECHANISM FOR METAL WORKING MACHINES.
APPLICATION FILED JUNE 2, 1920.

1,373,816.

Patented Apr. 5, 1921.

INVENTOR.
Clarence J. Howard
BY Howard E. Barlow
ATTORNEYS.

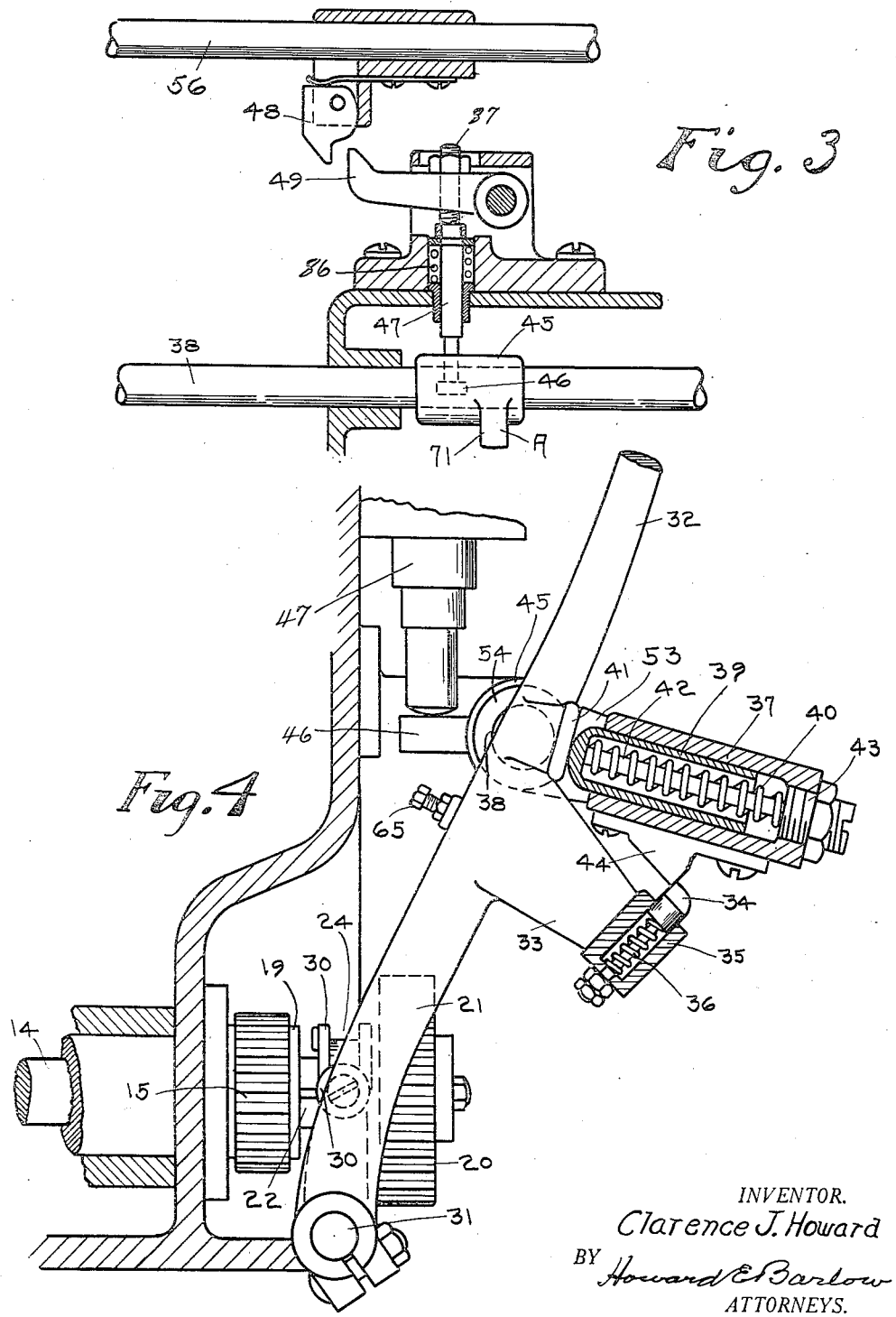

C. J. HOWARD.
SPEED CHANGING MECHANISM FOR METAL WORKING MACHINES.
APPLICATION FILED JUNE 2, 1920.

1,373,816.

Patented Apr. 5, 1921.

INVENTOR.
Clarence J. Howard
BY
Howard E Barlow
ATTORNEYS.

UNITED STATES PATENT OFFICE.

CLARENCE J. HOWARD, OF MANTON, RHODE ISLAND, ASSIGNOR TO BROWN & SHARPE MANUFACTURING COMPANY, OF PROVIDENCE, RHODE ISLAND, A CORPORATION OF RHODE ISLAND.

SPEED-CHANGING MECHANISM FOR METAL-WORKING MACHINES.

1,373,816. Specification of Letters Patent. Patented Apr. 5, 1921.

Application filed June 2, 1920. Serial No. 386,114.

*To all whom it may concern:*

Be it known that I, CLARENCE J. HOWARD, a citizen of the United States, and resident of Manton, town of Johnston, in the county of Providence and State of Rhode Island, have invented certain new and useful Improvements in Speed-Changing Mechanism for Metal - Working Machines, of which the following is a specification.

This invention relates to a speed-changing mechanism for metal-working machines, the same being more particularly adapted for use on machines for cutting gears and the like, but it may be applied to rack-cutting machines, milling machines and other analogous machines on which it is adapted to operate.

The object of the invention is to provide simple and effective mechanism whereby the rate of the cutting feed may be readily varied.

With these and other objects in view, the invention consists of certain novel features of construction, as will be more fully described, and particularly pointed out in the appended claims.

In the accompanying drawings:

Fig. 3 is a detail showing the trip dogs which are operated by the movement of the cutter carriage to release the speed-changing lever.

Fig. 4 is a view partially in section illustrating the action of the rock-shaft to release the latch on the speed-changing lever, also showing the spring means for forcing the lever to throw the clutch when the latch is disengaged.

In a gear-cutting machine where two or more cutters are mounted to operate simultaneously upon the work it is found desirable that the feed for the first cut should be comparatively slow, owing to the fact that both cutters are operating upon solid stock, and after this initial cut has been made it is desired that the rate of the working feed should be increased as the cutting requirements are then much less severe.

Figure 1:
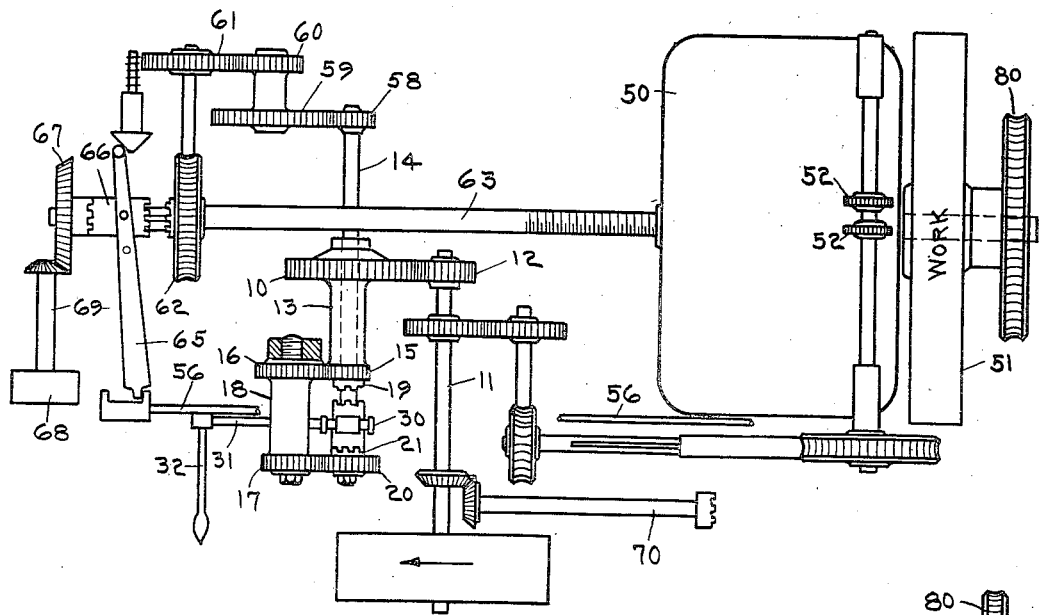
Figure 1 is a plan view showing a general arrangement of driving mechanism of a gear-cutting machine, and showing my improved means as connected to such mechanism for changing the speed ratio of the cutting feed by means of lever-operated clutch mechanism.
Figure 5:
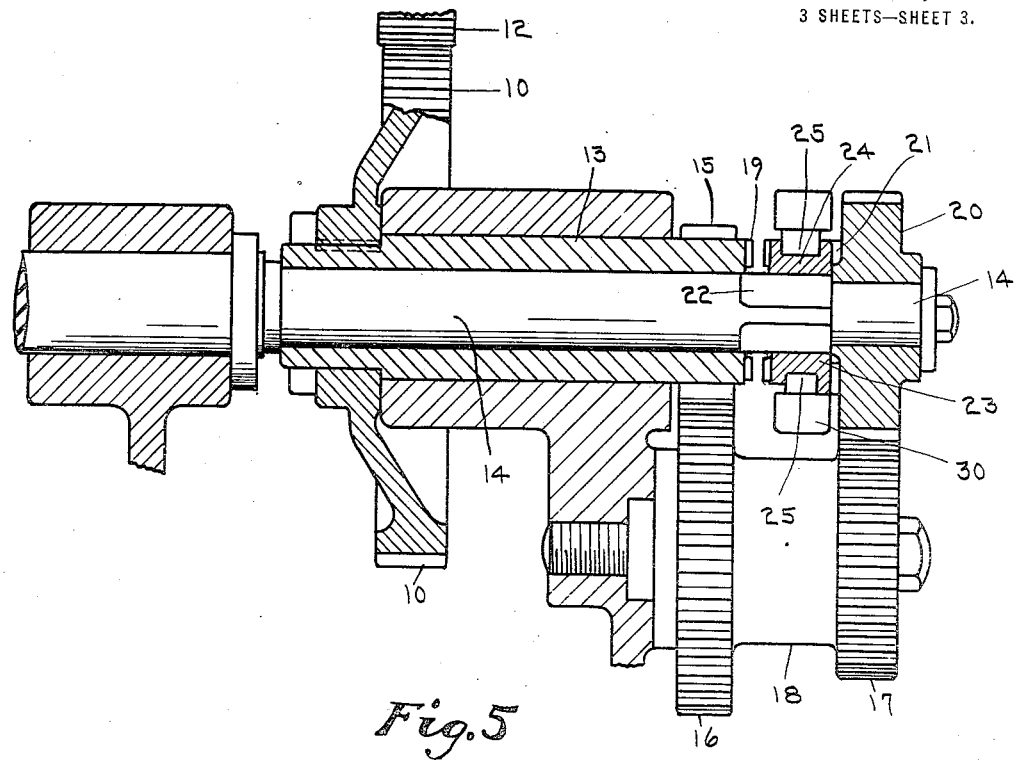
Fig. 5 is an enlarged detail showing the speed - changing gearing and the shift clutch.
Figure 6:
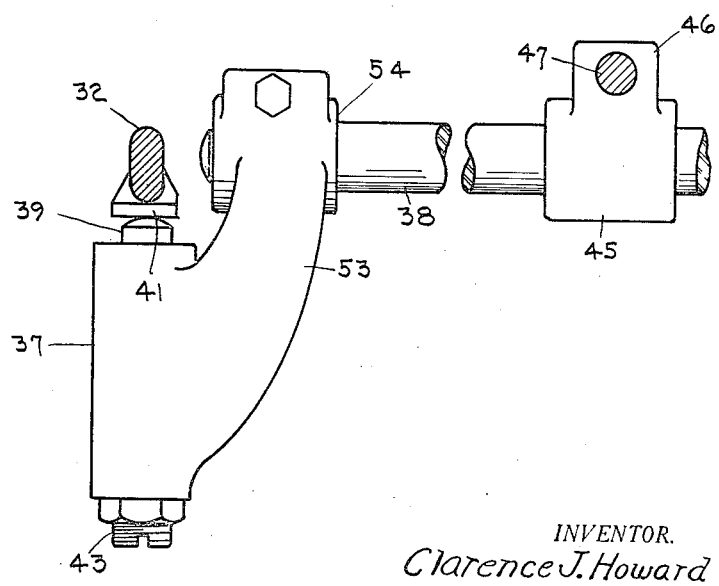
Fig. 6 is a plan view showing a detail of the rock-shaft and the arrangement of the spring-actuated plunger for shifting the speed-changing lever after the same is released by the rocking action of the shaft.

To accomplish this in an effective way, I have provided a simple form of mechanism that may be applied to any standard form of machine of this character, which mechanism comprises essentially a gear 10 which is driven by the pinion 12 from the main drive shaft 11, see Fig. 1. This gear 10 is provided with a sleeve 13 which is mounted to run loosely upon the shaft 14, see Fig. 5. On one end of this sleeve is the small gear 15 which is provided on one face with clutch teeth 19. This gear is designed to mesh with the idler gear 16 which, as shown, is approximately twice its diameter and which large gear is connected with a smaller idler gear 17 through the hub 18, the latter gear meshing with the gear 20 of approximately the same size which is mounted to run loose upon the end of shaft 14. This gear 20 is also provided on its inner face with clutch teeth 21.

The shaft 14 between gears 15 and 20 is squared as at 22 and on this squared portion is slidably mounted a clutch member 23 having teeth on its opposite faces to engage either those of gear 15, or those of gear 20 whereby either gear may be operatively connected to the shaft 14 to change its running speed. This clutch is provided with the usual central groove 24 and is engaged by the pins 25 on the yoke 30 which latter is mounted upon one end of the short shaft 31, see Fig. 2, to the opposite end of which is connected the speed-changing lever 32.

By this mechanism it will be seen that through the reducing gears 16 and 17 the gear 20 is caused to run and drive the clutch and shaft about one-half the speed they are driven when the clutch is in engagement with the gear 15.

It is understood that the relative sizes of these gears and consequently the speed ratios may be changed to suit the conditions under which the machine is desired to operate.

In order to provide a simple and effective way of operating this speed-changing clutch through the action of the operating lever 32, I have formed an arm 33 on the lever, which is provided with a boss 35 in which is mounted an endwise slidable latch 34, which latch is normally pressed outwardly into operating position by the spring 36. I have also provided a tubular casing member 37 supported from the rock shaft 38 by the arm 53 and hub 54. In this casing member is mounted a shell form of plunger 39 pressed outwardly by spring 40 against the face-plate 41 on the lever 32. Extending into the hollow portion of this plunger is a stop-pin 42 which is a part of the adjustable plug 43 said pin serving to limit the outward stroke of the speed change lever to prevent undue strain being applied to the clutch parts by such movement of the lever and an adjustable screw 65 is arranged to limit its stroke in the opposite direction. On the under side of this plunger casing is fixed a catch member 44 which is adapted to engage the end of the latch 34 to retain the lever in the out or slow feeding position.

Figure 2:
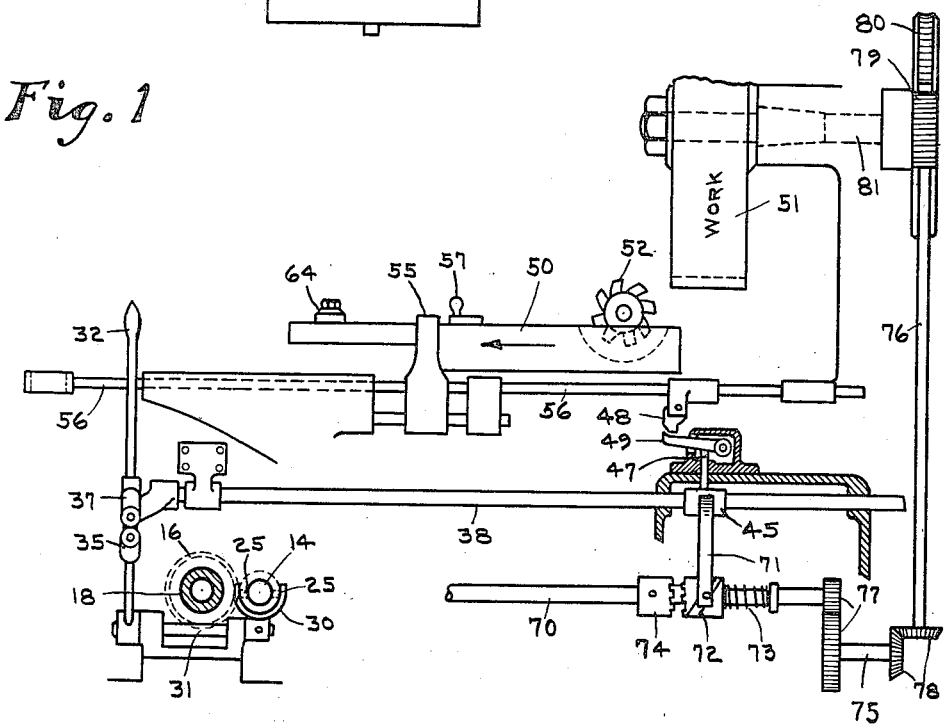
Fig. 2 is a side elevation partly in section showing the cutter carriage and means whereby the action of this carriage is caused to trip the operating lever to throw the clutch and change the rate of working feed.

The rock shaft 38, as best illustrated in Fig. 2, extends along the side of the machine and is provided with a collar 45 having an inwardly-extending boss 46, see Figs. 3 and 4, which is engaged by the spring returned presser pin 47 when the trip dog 48 engages and rides back over the upturned end of the trip lever 49 as the carriage 50 through dog 57 and member 55 moves shaft 56 to the left as this carriage approaches the end of its return stroke after the cutters 52 have acted upon the work 51, and upon moving to the right the dog 48 constructed as shown in Fig. 3, tips up and rides over lever 49 without disturbing it.

The presser pin 47 is normally held in raised position by spring 86 and is engaged at its upper end by the adjustable presser screw 87 in the lever 49.

The forward or feeding movement of this cutter carriage causes the dog 64 to engage the arm 55 which is mounted on the slide rod 56 to move this slide rod and the latch 48 from the position illustrated in Fig. 3, over the end of the trip lever to the position illustrated in Fig. 2, and a return or backward movement of the cutter carriage then causes the dog 57 to engage the other side of the arm 55 and by moving the slide rod 56 to the left the trip dog engages the trip lever 49, forces it downward and through the vertical presser pin 47 causes the shaft 38 to rock and lift the catch 44 clear of the latch 34 thereby releasing the speed-changing lever 32 which under action of the spring 40 moves inwardly and shifts the clutch 30 from the slow to the fast driving position which action takes place after the initial cut has been made through the work.

This automatic shift causes the gear 10 to drive direct upon the shaft 14 and through gears 58, 59, 60, 61 and 62, the latter being connected with feed screw shaft 63 through clutch 66, to increase the speed of the feed screw 63 and so increase the rate of the working feed of the cutter carriage over that when the cutters were caused to make the initial cut in the work.

The reversing of the feed of the cutter carriage is accomplished by the engagement of the dog 64 on the carriage with the member 55 on the shift rod 56 as the carriage moves to the right (a portion of which rod is shown as being broken away in Fig. 1). This movement to the right causes the lever 65 to throw the driving clutch 66 into engagement with the loose gear 67 whereby the feed-screw shaft 63 is then driven from the independently driven pulley 68 through the shaft 69.

After the cutter has been withdrawn from the work the latter is rotated in the usual way by the mechanism illustrated in Fig. 2, wherein when the dog 57 on the carriage, engages the member 55 and throws the rod 56 to the left, then the dog is caused to engage the lever 49 and through the pin 47 rock the shaft 38 to raise the arm 71 out of the cam-groove in the clutch member 72, thereby permitting this clutch member under action of its spring 73 to advance into engagement with the clutch 74 on drive shaft 70, which causes short shaft 75 to operate the upright shaft 76 through gears 77 and 78 to cause the worm 79 to operate the index worm wheel 80 which is mounted on the work spindle 81, whereby the work 51 is rotated another step to permit another tooth to be cut therein.

The movement of this rod 56 to the left, by the reverse movement of the table, also moves lever 65 to throw clutch 66 again into engagement with the forward driving gear 62 causing the cutter to make another cut through the work.

After the balance of the gear blank has been cut, it is only necessary to again manually move the lever 32 back into the position illustrated in Fig. 4, by which action the operating spring 40 is compressed, and the latch 34 is depressed until is snaps into position and is locked behind the catch 44 thereby shifting the clutch from the fast to the slow feeding position and in which position it remains during the time that the cutting carriage travels forward to make the initial cut through the next piece of work, after which the return movement of this carriage releases the lever to automatically shift the clutch and increase the rate of work feed to that required for cutting the rest of the blank.

I have described the operation of a gear-cutting machine, but I do not wish to be restricted to the application of my speed-changing mechanism to such a machine as this mechanism may be applied to rack-cutting machines, milling machines and other analogous metal-working machines on which it is adapted to operate. I have shown the work support as being fixed and the cutter support as movable but any suitable arrangement of these parts may be made. I do not wish to be restricted to the exact construction of the speed-changing mechanism described and illustrated and I desire it to be understood that I reserve the privilege of resorting to all the mechanical changes to which the device is susceptible, the invention being defined and limited only by the terms of the appended claims.

I claim:

1. In a gear-cutting machine, a work-support, a cutter support, a pair of cutters operatively mounted on said support both of said cutters being arranged to operate simultaneously upon the work, means for moving one support slowly relatively to the other causing both cutters to make an initial or roughening cut, and means for increasing the feeding ratio when but one of said cutters is making an initial cut and the other is finishing a roughening cut previously made.

2. In a gear-cutting machine, a work-support, a cutter support, a pair of cutters on said cutter support arranged side by side to operate simultaneously upon the work, means for moving one of said supports slowly relatively to the other to cause both cutters to make an initial or roughening cut, and hand-operated means by which the feeding ratio may be increased after completing the cycle of making the initial cut.

3. In a metal-working machine, a work-support, a cutter-support, means for moving one support relatively to the other to cause the cutter to act upon the work, means for returning the movable support to position the cutter for another cutting stroke, and means for automatically changing the rate of working feed of said movable support after completing the initial cutting stroke.

4. In a gear-cutting machine, a work-support, a cutter-support, means for moving one support relatively to the other to cause the cutter to act upon the work, means for causing a relative repositioning of the work and cutter, means for automatically changing the rate of working feed of the movable support after completing the cycle of making the initial cut, a feed control mechanism, and manually operable means for resetting said mechanism.

5. In a metal-working machine, a work-support, a cutter-support, means for moving one support relatively to the other to cause the cutter to act upon the work, a support on which the work is adjusted after each cutting stroke, and means for automatically increasing the rate of working feed of the moving support after completing the cycle of making the initial cut.

6. In a metal-working machine, a work-support on which the work is adapted to be rotated, a cutter support, means for moving one support relatively to the other to cause the cutter to act upon the work, means for obtaining a relative lateral adjustment between the work and cutter after each cutting stroke, means for automatically increasing the rate of working feed of the moving support after completing the cycle of making the initial cut, and manually operable means for resetting said mechanism.

7. In a metal-working machine, a fixed work-support, a cutter-support movable relatively to said work-support to cause the cutter to act upon the work, and means for automatically increasing the rate of working feed of said moving-support after completing the cycle of making the initial cut.

8. In a metal working machine, a work-support, a cutter-support, means for advancing one support relatively to the other to make a first cut and for returning the movable support after a cutting stroke, means for automatically increasing the rate of working feed of the moving-support for subsequent cuts, and means whereby the feed mechanism may be manually reset for a slower action when desired.

9. In a metal-working machine, a work-support, a cutter support, means for moving one support relatively to the other to cause the cutter to act upon the work, a support having means for adjusting the work after each cutting stroke, a shift lever, a tripper for said lever, and means whereby a predetermined movement of the moving support is caused to operate said tripper to release said lever to change the working speed.

10. In a gear-cutting machine, a work-support, a cutter-support, means for moving one support relatively to the other to cause the cutter to act upon the work, means for rotating the work after each cutting stroke, a feed change member, a tripper for said member, means whereby a predetermined movement of the moving support is caused to operate said tripper to release said member to change from one working speed to another, and means whereby said member may be manually reset to again change the rate of feed when desired.

11. In a metal-working machine, a work-support, a cutter-support, means for moving one support relatively to the other to cause the cutter to act upon the work, means for adjusting the work relatively to the cutter, a speed-changing member, a pair of latches, and means whereby a predetermined movement of the moving support operates through said latches to cause said shifting member to change the rate of the working feed after the initial cutting stroke.

12. In a gear-cutting machine, a work-support, a cutter-support, a plurality of rotatable cutters operatively mounted on said support, means for moving one support relatively to the other to cause the cutters to act upon the work, means for adjusting the work relatively to the cutters, and means for automatically increasing the rate of working feed of the moving support while traveling over the same range or distance after the initial cut has been made.

13. In a gear-cutting machine, a work-support, a cutter-support, a plurality of rotatable cutters operatively mounted on said support, means for moving one support relatively to the other to cause said cutters to act upon the work, means for adjusting the work relative to the cutters, means for automatically returning the movable support to position the cutter for another cutting stroke and increasing the rate of the cutting feed after the initial cut, and manually operable means for reducing the rate of said feed.

14. In a gear-cutting machine, a work-support, a cutter, a cutter support, means for moving one support relatively to the other to cause the cutter to act upon the work, a spring actuated speed change lever, a latch for retaining said lever in one position, and means whereby the moving support is caused to release said lever at a predetermined point in the travel of said support to cause the rate of working feed to be increased.

15. In a gear-cutting machine, a work support, a cutter, a cutter support, means for moving one support relatively to the other to cause the cutter to act upon the work, a spring-actuated speed change lever, a latch for retaining said lever in slow feeding position, and means whereby the moving-support is caused to release said lever to cause the rate of working feed to be increased, said lever being adapted to be reset to reduce the rate of the working feed.

In testimony whereof I affix my signature.

CLARENCE J. HOWARD.